(12) United States Patent
Tang et al.

(10) Patent No.: US 8,570,721 B2
(45) Date of Patent: Oct. 29, 2013

(54) ELECTRONIC DEVICE WITH INTERLATCHED FRONT COVER AND BACK PLATE

(75) Inventors: Xue-Dong Tang, Shenzhen (CN); Ke-Hui Peng, Shenzhen (CN); Li-Ni Liang, Shenzhen (CN); Ren-Wen Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 79 days.

(21) Appl. No.: 13/237,945

(22) Filed: Sep. 21, 2011

(65) Prior Publication Data
US 2012/0327570 A1 Dec. 27, 2012

(30) Foreign Application Priority Data
Jun. 24, 2011 (CN) .......................... 2011 1 0173048

(51) Int. Cl.
*G06F 1/16* (2006.01)
*G02F 1/1333* (2006.01)

(52) U.S. Cl.
USPC ........ 361/679.02; 345/169; 349/58; 248/917; 361/679.27

(58) Field of Classification Search
USPC .............. 361/679.05–679.07, 679.26–679.3, 361/679.55–679.58; 400/682, 82, 691, 692, 400/693, 488, 489; 341/22; 248/917–924; 345/168, 169, 905; 312/223.2; 349/58, 349/65
See application file for complete search history.

(56) References Cited

U.S. PATENT DOCUMENTS

| | | | | |
|---|---|---|---|---|
| 5,196,993 A | * | 3/1993 | Herron et al. | 361/679.29 |
| 5,422,751 A | * | 6/1995 | Lewis et al. | 349/59 |
| 8,264,837 B2 | * | 9/2012 | Pakula et al. | 361/679.58 |

* cited by examiner

*Primary Examiner* — Zachary M Pape
*Assistant Examiner* — Douglas Burtner
(74) *Attorney, Agent, or Firm* — Altis & Wispro Law Group, Inc.

(57) ABSTRACT

An exemplary electronic device includes a front cover, a display screen and two speakers located on the back surface, and a back plate abutting against the display screen and two speakers. Five fasteners extend backwardly from a back surface of the front cover. Each of the fasteners includes a connecting plate extending backwardly from the back surface and a top plate formed at a free end of the connecting plate. Five latching tabs are formed on the back plate corresponding to the fasteners. Each of the latching tabs includes a latching tip latched between the top plate of the corresponding fastener and the back surface of the front cover. The back plate abuts against the display screen and the two speakers, thus mounting the display screen and the two speakers on the front cover.

15 Claims, 6 Drawing Sheets

ELECTRONIC DEVICE WITH INTERLATCHED FRONT COVER AND BACK PLATE

BACKGROUND

1. Technical Field

The present disclosure generally relates to electronic devices, and particularly to an electronic device having a display screen mounted on a front cover thereof.

2. Description of Related Art

Many electronic devices, such as notebook computers, portable DVD (Digital Versatile Disc) players, iPads, and so on include a display panel. The display panel includes a mounting frame, and a display screen and a speaker mounted on the mounting frame with a plurality of screws. Although using the screws achieves the desired fastening objective, in manufacturing it is time consuming and requires quite a lot of manpower and material resources. This adds to the cost of the electronic device.

Therefore, what is needed is an electronic device which can overcome the described limitations.

DETAILED DESCRIPTION

Figure 1:
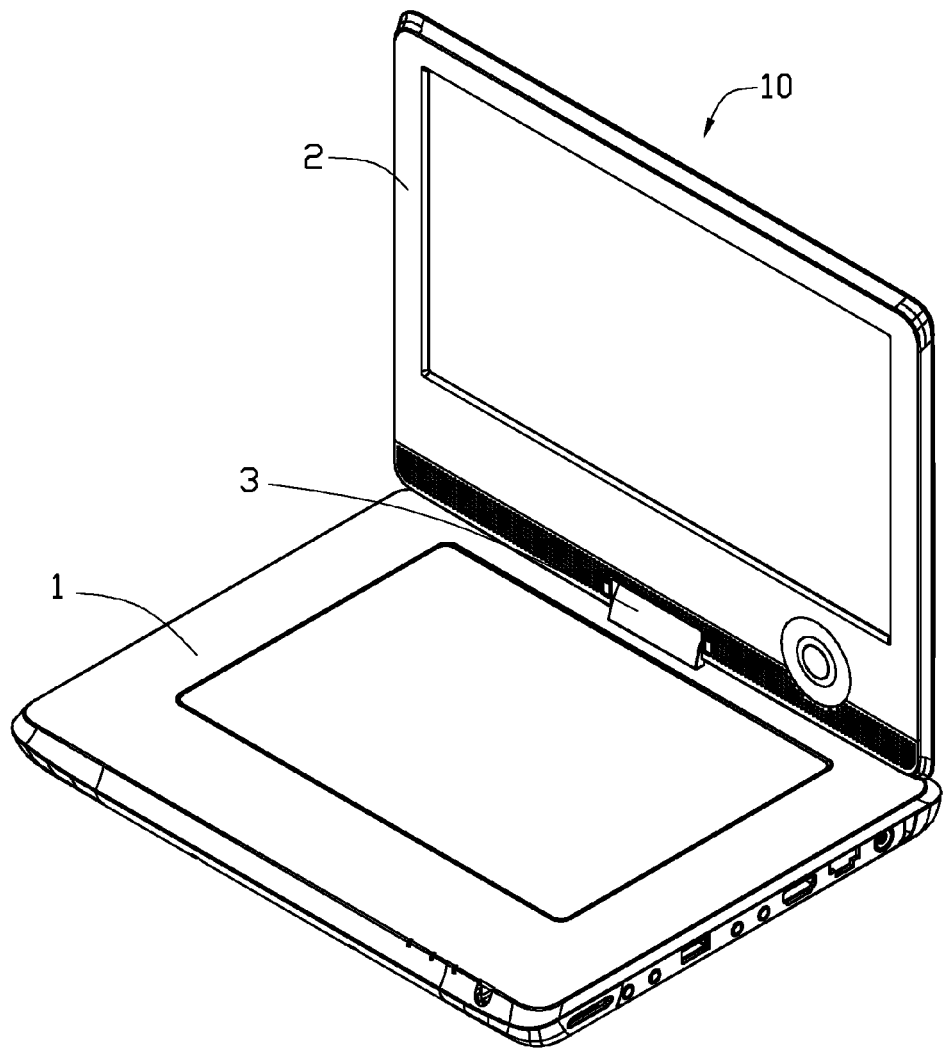
FIG. 1 is an isometric, assembled view of an electronic device in accordance with an exemplary embodiment of the present disclosure.

Referring to FIG. 1, an electronic device 10 in accordance with an exemplary embodiment of the present disclosure is shown. The electronic device 10 includes a host 1 and a display panel 2 pivotally mounted on the host 1 through a hinge 3. In this embodiment, the electronic device 1 is a portable DVD player.

Figure 2:
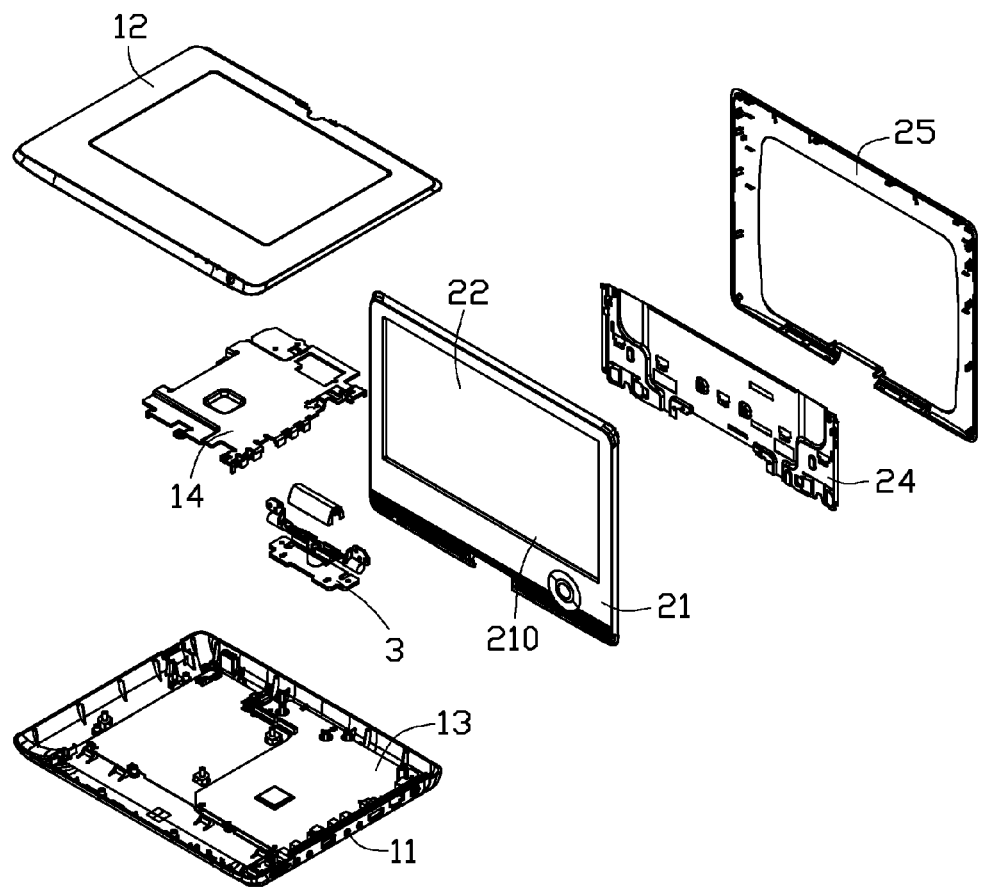
FIG. 2 is an exploded view of the electronic device of FIG. 1.
Figure 3:
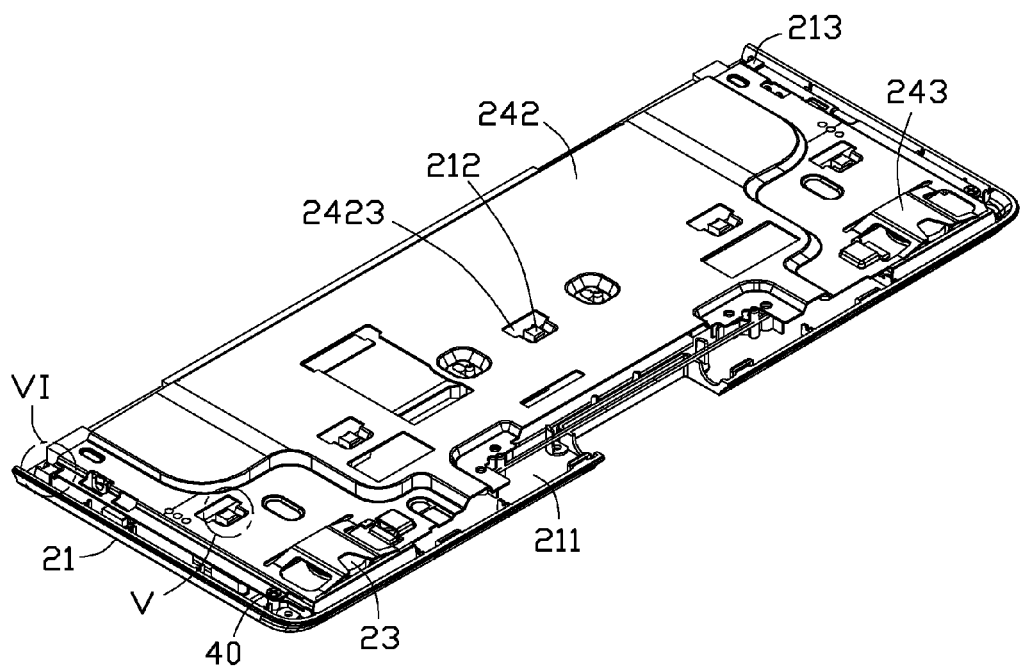
FIG. 3 is an enlarged, isometric, rear assembled view of a bottom portion of a display panel of the electronic device of FIG. 1, but only showing a back plate and a bottom portion of a front cover of the bottom portion of the display panel.
Figure 4:
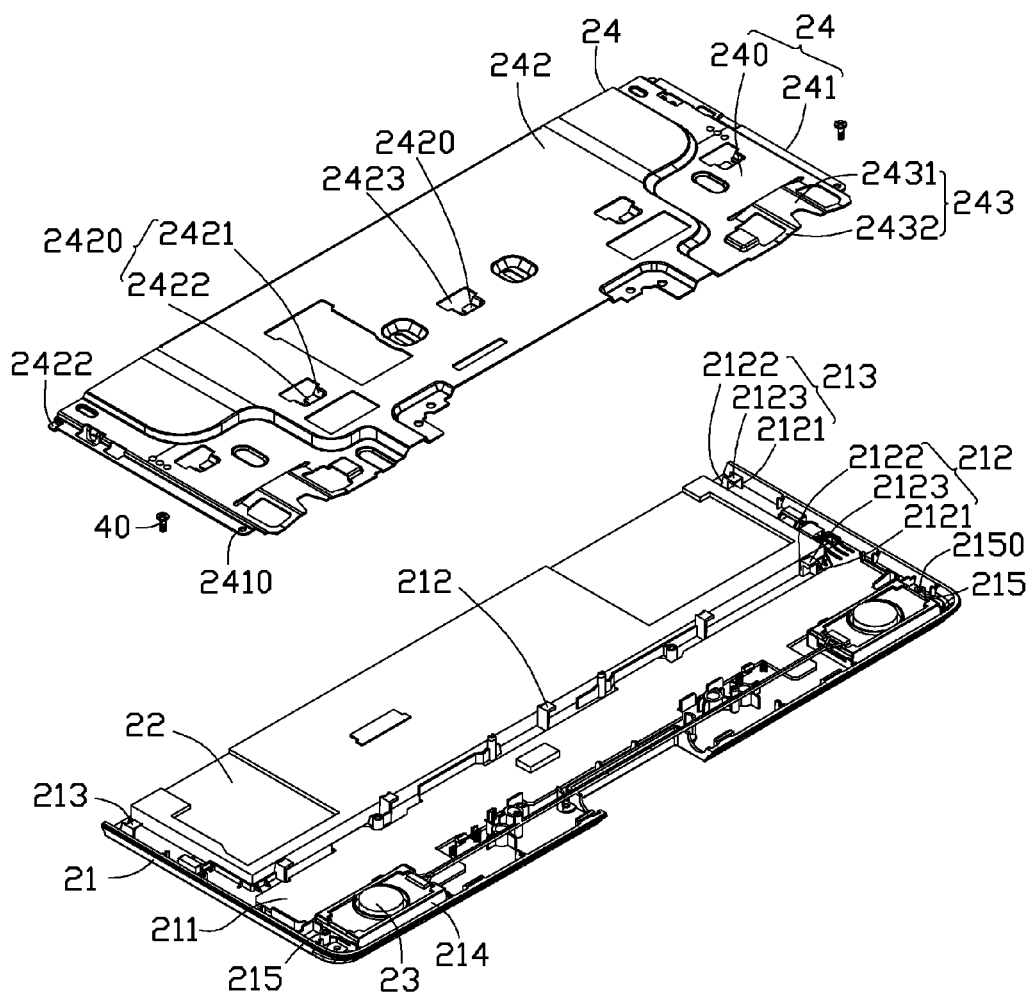
FIG. 4 is an exploded view of the display panel of FIG. 3.

Referring also to FIGS. 2 to 4, the host 1 includes a bottom cover 11, a top cover 12, and an electronic module 13 and a heat dissipation module 14 mounted between the top cover 12 and the bottom cover 11. The heat dissipation module 14 is adapted for dissipating heat of the electronic module 13.

The display panel 2 includes a front cover 21, a display screen 22, two speakers 23, a back plate 24 for mounting the display screen 22 and the two speakers 23 on the front cover 21, and a back cover 25 engaged at a back side of the front cover 21.

The front cover 21 is rectangular, and defines a rectangular opening 210 in a middle portion thereof. The display screen 22 is mounted on a back surface 211 of the front cover 21 and exposed at the opening 210. The two speakers 23 are mounted at two opposite sides of a bottom portion of the back surface 211.

Figure 5:
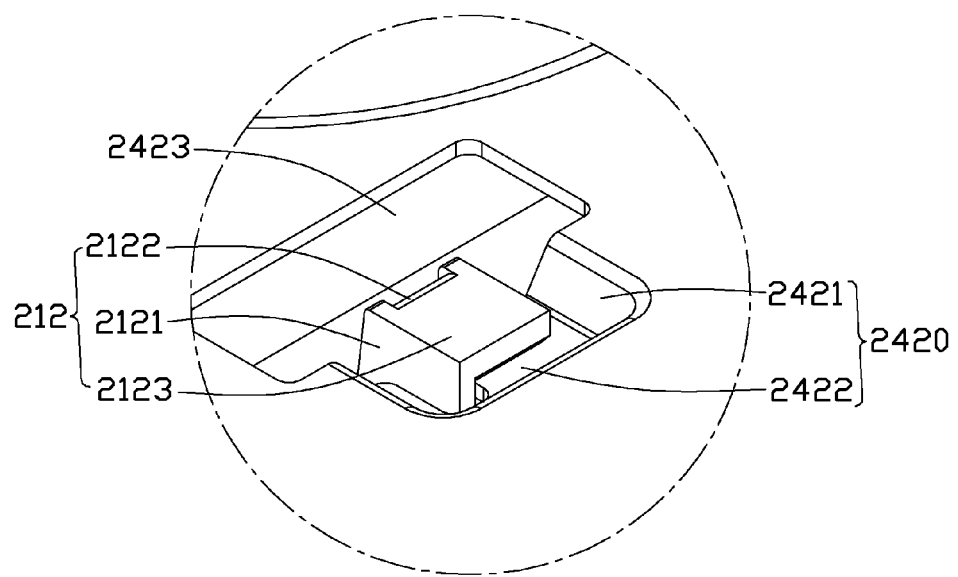
FIG. 5 is an enlarged view of the circled portion V of FIG. 3.
Figure 6:
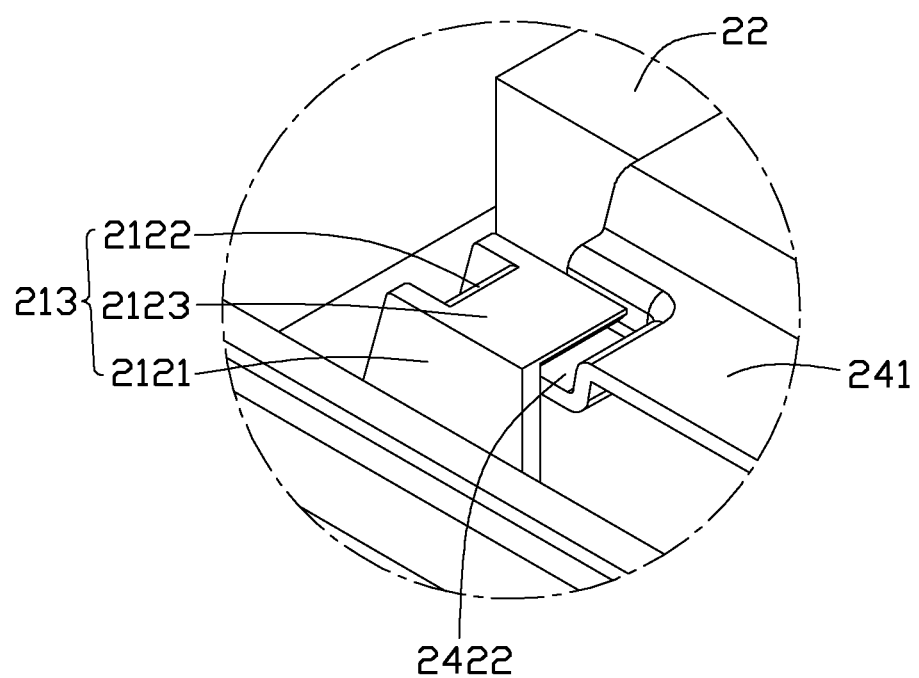
FIG. 6 is an enlarged view of the circled portion VI of FIG. 3.

Referring also to FIGS. 5 and 6, a plurality of first fasteners 212 are formed on the back surface 211 of the front cover 21 adjacent to a bottom edge of the opening 210. In this embodiment, there are first fasteners 212, which are arranged in a line along the bottom edge of the opening 210 and spaced from each other. Each of the first fasteners 212 includes a connecting plate 2121, an abutting plate 2122 and a top plate 2123. The connecting plate 2121 and the abutting plate 2122 extend perpendicularly from the back surface 211 of the front cover 21 and perpendicularly connect with each other. The top plate 2123 is perpendicular to the connecting plate 2121 and the abutting plate 2122, and connects with tops of the connecting plate 2121 and abutting plate 2122. The top plate 2123 parallels the back surface 211 of the front cover 21 and is spaced from the back surface 211 of the front cover 21. Two second fasteners 213 are formed on the back surface 211 adjacent to left and right edges of the opening 210, respectively. Each of the second fasteners 213 has the same structure as each of the first fasteners 212. That is, each of the second fasteners 213 includes a connecting plate 2121, an abutting plate 2122 and a top plate 2123. The connecting plates 2121 of the first fasteners 212 are parallel to the connecting plates 2121 of the second fasteners 213. The abutting plates 2122 of the first fasteners 212 and the abutting plates 2122 of the second fasteners 213 are parallel to each other and face a bottom of the front cover 21.

Two mounting seats 214 are formed at two opposite sides of the bottom portion of the back surface 211, for fixing the two speakers 23. A mounting sleeve 215 is formed on the back surface 211 adjacent to each of the mounting seats 214. The mounting sleeve 215 defines a mounting hole 2150 therein, for receiving a screw 40.

The back plate 24 includes a main body 240, and two mounting flanges 241 formed at two opposite sides of the main body 240. The main body 240 includes a first abutting portion 242, and two second abutting portions 243 formed at two opposite sides of a bottom of the first abutting portion 242.

The display screen 22 is nipped between the first abutting portion 242 and the front cover 21. A plurality of latching tabs 2420 are formed on the first abutting portion 242, corresponding to the first fasteners 212 of the front cover 21. The latching tabs 2420 are latched with the first fasteners 212 respectively, to mount the back plate 24 on the front cover 21. Each of the latching tabs 2420 includes an extending portion 2421 extending perpendicularly from the first abutting portion 242 towards the front cover 21, and a latching tip 2422 extending from a free end of the extending portion 2421 along a direction parallel the first abutting portion 242. In this embodiment, the latching tab 2420 is formed on the first abutting portion 242 through punching, and a punching hole 2423 is defined adjacent the latching tab 2420.

The second abutting portions 243 protrude out of the main body 240, and are adapted for abutting the two speakers 23, respectively. Each of the second abutting portions 243 includes an abutting seat 2431, and four connecting arms 2432 extending outwardly from two opposite sides of the abutting seat 2431. The abutting seat 2431 is parallel with and spaced from the main body 240. Each of the connecting arms 2432 is strip-shaped and connects with the main body 240 slantwise. Each connecting arm 2432 is able to deform resiliently. In this embodiment, the second abutting portions 243 are formed through punching.

Each of the mounting flanges 241 extends perpendicularly from a lateral side of the main body 240, and then extends outwardly along a direction parallel with the main body 240. Each mounting flange 241 is strip-shaped along the lateral side of the main body 240. One end portion of the mounting flange 241 is depressed to form a latching tip 2422. Another end portion of the mounting flange 241 defines a through hole 2410 therein, corresponding to the mounting hole 2150 of the respective mounting sleeve 215 of the front cover 21.

During assembly of the display panel 2, the display screen 22 is placed on the back surface 211 of the front cover 21, with a display area (not labeled) of the display screen 22 oriented toward the opening 210 of the front cover 21. By this arrangement, the first fasteners 212 and the second fasteners 213 surround the display screen 22. The back plate 24 is placed on the display screen 22. Each of the first fasteners 212 is located in a corresponding punching hole 2423 of the back plate 24, and the latching tip 2422 of each mounting flange 241 is oriented toward the abutting plate 2122 of the corresponding second fastener 213. The second abutting portions 243 of the back plate 24 are respectively located on the two speakers 23. The back plate 24 is pressed toward the display screen 22. By this arrangement, the first abutting portion 242 snugly abuts against the display screen 22, and the two second abutting portions 243 snugly abut against the two speakers 23, respectively. The connecting arms 2432 of the second abutting portions 243 deform resiliently.

Then the back plate 24 is pushed to move towards a top side of the front cover 21 to cause the latching tip 2422 of each of the latching tabs 2420 to enter a gap between the top plate 2123 of the corresponding first fastener 212 and the back surface 211 of the front cover 21, and to cause the latching tip 2422 of each of the mounting flanges 241 to enter a gap between the top plate 2123 of the corresponding second fastener 213 and the back surface 211 of the front cover 21, until the latching tips 2422 of each latching tab 2420 and the mounting flanges 241 respectively abut against the abutting plates 2123 of the first and second fasteners 212, 213. At this stage, the through hole 2410 of each of the mounting flanges 241 is aligned with the mounting hole 2150 of the corresponding mounting sleeve 215 of the front cover 21. The screw 40 is inserted into the through hole 2410 of the mounting flange 241 and the mounting hole 2150 of the corresponding mounting sleeve 215 to firmly mount the back plate 24 on the front cover 21. The back plate 24 snugly abuts against the display screen 22 and the speakers 23, thus mounting the display screen 22 and the speakers 23 on the front cover 21.

In the electronic device 10, the back plate 24 is mounted to the front cover 21 through a combination of the first and second fasteners 212, 213, the latching tips 2422 and the screws 40, instead of solely using screws. This avoids a time consuming assembling process for the back plate 24. In addition, both the display screen 22 and the speakers 23 are mounted by the back plate 24. This not only facilitates the assembling process of the speakers 23, but also decreases a component cost of the electronic device 10.

The back plate 24 of the electronic device 10 can be made of plastic through injection molding, or made of metal through punching. When the back plate 24 is made of metal, the back plate 24 can act as a good EMI (electromagnetic interference) shield for the display screen 22 and the speakers 23.

It is to be understood, however, that even though numerous characteristics and advantages of the exemplary embodiments have been set forth in the foregoing description, together with details of the structures and functions of the embodiments, the disclosure is illustrative only, and that changes may be made in detail, especially in matters of shape, size, and arrangement of parts within the principles of the embodiments to the full extent indicated by the broad general meaning of the terms in which the appended claims are expressed.

What is claimed is:

1. An electronic device comprising:
    a front cover provided with a plurality of first fasteners extending backwardly from a back surface thereof, each of the first fasteners comprising a connecting plate extending backwardly from the back surface and a top plate formed at a free end of the connecting plate;
    a display screen located on the front cover;
    a back plate provided with a plurality latching tabs formed thereon corresponding to the first fasteners of the front cover, each of the latching tabs comprising a latching tip, the latching tip of each latching tab latched between the top plate of a corresponding first fastener and the back surface of the front cover, and the back plate abutting against the display screen, thus mounting the display screen on the front cover; and
    a speaker, wherein the back plate abuts against the speaker and mounts the speaker on the front cover;
    wherein the back plate comprises a main body and two mounting flanges formed at two opposite lateral sides of the main body, the main body comprises a first abutting portion and a second abutting portion, the mounting flanges are mounted on the front cover, the first abutting portion abuts against the display screen, the second abutting portion abuts against the speaker, and the plurality of latching tabs are formed on the first abutting portion; and
    wherein each of the mounting flanges is strip-shaped, one end portion of the mounting flange is depressed to form a latching tip, another end portion of the mounting flange defines a through hole, two second fasteners are formed on the front cover corresponding to the latching tips of the two mounting flanges, the first fasteners and the second fasteners are substantially identical in structure, the latching tip of the mounting flange is latched between a top plate of a corresponding second fastener and the front cover, the front cover defines two mounting holes corresponding to the through holes of the two mounting flanges, and each of the mounting holes is aligned with a corresponding through hole for extending through a screw.

2. The electronic device of claim 1, wherein the front cover defines a rectangular opening therein, the display screen is exposed at the opening, and the plurality of first fasteners are arranged in a line along an edge of the opening and spaced from each other.

3. The electronic device of claim 1, wherein a mounting seat is formed on the back surface of the front cover for mounting the speaker, the second abutting portion is aligned with the mounting seat, and two mounting sleeves are formed on the back surface of the front cover, the two mounting holes are respectively defined in the two mounting sleeves, and one of the mounting sleeve is adjacent to the mounting seat.

4. The electronic device of claim 1, wherein the second abutting portion comprises an abutting seat and four connecting arms extending from two opposite side of the abutting seat, and each of the connecting arms is strip-shaped and is able to deform resiliently.

5. The electronic device of claim 1, wherein each of the latching tabs further comprises an extending portion extending from the back plate towards the back surface of the front cover, and the latching tip of each latching tab extends from a free end of the extending portion towards the connecting plate of the corresponding first fastener.

6. The electronic device of claim 1, wherein each of the first fasteners and the second fasteners further comprises an abutting plate, the abutting plate of each of the first fasteners perpendicularly connects with the connecting plate of the first fastener and the back surface of the front cover, the top plate of the first fastener connects with free ends of the connecting plate and the abutting plate of the first fastener, the abutting plate of each of the second fasteners perpendicularly connects with the connecting plate of the second fastener and the back surface of the front cover, and the top plate of the second fastener connects with free ends of the connecting plate and the abutting plate of the second fastener.

7. The electronic device of claim 6, wherein the connecting plates of the first fasteners and the second fasteners are parallel to each other, and the abutting plates of the first fasteners and the second fasteners are parallel to each other.

8. The electronic device of claim 7, wherein the back plate defines a punching hole adjacent to each of the latching tabs corresponding to each of the first fasteners, each of the first fasteners is received in the corresponding punching hole.

9. An electronic device comprising:
  a front cover, a plurality of first fasteners extending backwardly from a back surface of the front cover, each of the first fasteners comprising a connecting plate extending backwardly from the back surface and a top plate formed at a free end of the connecting plate;
  a display screen located on the back surface of the front cover;
  two speakers located on the back surface adjacent to the display screen;
  a back plate with a plurality latching tabs formed thereon corresponding to the first fasteners of the front cover, each of the latching tabs comprising a latching tip, the latching tip of each latching tab latched between the top plate of a corresponding first fastener and the back surface of the front cover, the back plate abutting against the display screen and the two speakers, thus mounting the display screen and the two speakers on the front cover;
  wherein the front cover defines a rectangular opening therein, the display screen is exposed at the opening, and the plurality of first fasteners are arranged in a line along an edge of the opening and spaced from each other;
  wherein the back plate comprises a main body and two mounting flanges formed at two opposite lateral sides of the main body, the main body comprises a first abutting portion and two second abutting portions adjacent to the first abutting portion, the mounting flanges are mounted on the front cover, the first abutting portion abuts against the display screen, the two second abutting portion respectively abut against the two speakers, and the plurality of latching tabs are formed on the first abutting portion; and
  wherein each of the mounting flanges is strip-shaped, one end portion of the mounting flange is depressed to form a latching tip, another end portion of the mounting flange defines a through hole, two second fasteners are formed on the front cover corresponding to the latching tips of the two mounting flanges, the first fasteners and the second fasteners are substantially identical in structure, the latching tip of the mounting flange is latched between a top plate of a corresponding second fastener and the front cover, the front cover defines two mounting holes corresponding to the through holes of the two mounting flanges, and each of the mounting holes is aligned with a corresponding through hole for extending through a screw.

10. The electronic device of claim 9, wherein two mounting seats are formed on the back surface of the front cover for mounting the speaker, the two second abutting portions are aligned with the two mounting seats, and two mounting sleeves are formed on the back surface of the front cover, the two mounting holes are respectively defined in the two mounting sleeves, and the two mounting sleeves are respectively adjacent to the two mounting seats.

11. The electronic device of claim 9, wherein each of the second abutting portions comprises an abutting seat and four connecting arms extending from two opposite side of the abutting seat, and each of the connecting arms is strip-shaped and is able to deform resiliently.

12. The electronic device of claim 9, wherein the back plate defines a punching hole adjacent to each of the latching tabs corresponding to each of the first fasteners, each of the first fasteners is received in the corresponding punching hole.

13. The electronic device of claim 9, wherein each of the first fasteners and the second fasteners further comprises an abutting plate, the abutting plate of each of the first fasteners perpendicularly connects with the connecting plate of the first fastener and the back surface of the front cover, the top plate of the first fastener connects with free ends of the connecting plate and the abutting plate of the first fastener, the abutting plate of each of the second fasteners perpendicularly connects with the connecting plate of the second fastener and the back surface of the front cover, and the top plate of the second fastener connects with free ends of the connecting plate and the abutting plate of the second fastener.

14. The electronic device of claim 13, wherein the connecting plates of the first fasteners and the second fasteners are parallel to each other, and the abutting plates of the first fasteners and the second fasteners are parallel to each other.

15. An electronic device comprising:
  a front cover provided with a plurality of first fasteners extending backwardly from a back surface thereof, each of the first fasteners comprising a connecting plate extending backwardly from the back surface and a top plate formed at a free end of the connecting plate;
  a display screen located on the front cover;
  a back plate provided with a plurality latching tabs formed thereon corresponding to the first fasteners of the front cover, each of the latching tabs comprising a latching tip, the latching tip of each latching tab latched between the top plate of a corresponding first fastener and the back surface of the front cover, and the back plate abutting against the display screen, thus mounting the display screen on the front cover; and
  a speaker, wherein the back plate abuts against the speaker and mounts the speaker on the front cover;
  wherein the back plate comprises a main body and two mounting flanges formed at two opposite lateral sides of the main body, the main body comprises a first abutting portion and a second abutting portion, the mounting flanges are mounted on the front cover, the first abutting portion abuts against the display screen, the second abutting portion abuts against the speaker, and the plurality of latching tabs are formed on the first abutting portion; and
  wherein the second abutting portion comprises an abutting seat and four connecting arms extending from two opposite side of the abutting seat, and each of the connecting arms is strip-shaped and is able to deform resiliently.

* * * * *